Figure 1:
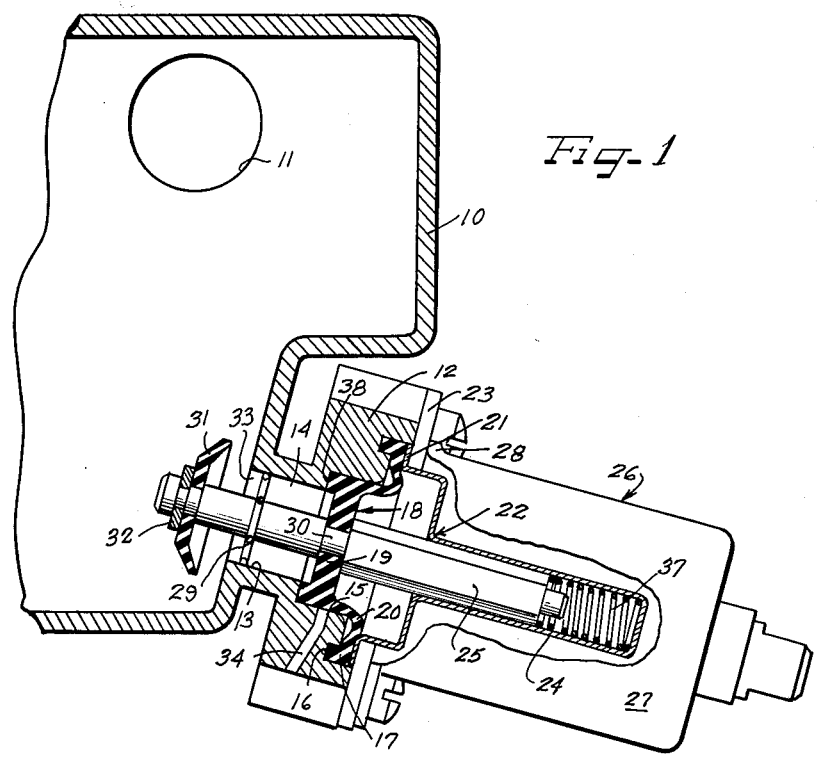

Jan. 15, 1963  R. R. DAHL ETAL  3,073,490
FLUID DISPENSING VALVE
Filed July 6, 1959

Inventors
Robert R. Dahl
Carl C. Bauerlein
by Hill, Sherman, Meroni, Gross & Simpson Attys.

United States Patent Office 3,073,490
Patented Jan. 15, 1963

3,073,490
FLUID DISPENSING VALVE
Robert R. Dahl and Carl C. Bauerlein, Lincolnwood, Ill., assignors to The Dole Valve Company, Morton Grove, Ill., a corporation of Illinois
Filed July 6, 1959, Ser. No. 824,973
1 Claim. (Cl. 222—453)

This invention relates to fluid dispensers which are particularly adapted for use in conjunction with automatic washing machines in the dispensing of detergent and more particularly relates to a fluid dispenser which is adapted to selectively dispense a predetermined volume of fluid from a container.

The dispenser which forms the subject of the present invention comprises generally a slug valve body which has a measuring chamber formed therein and which has an inlet and an outlet opening to the measuring chamber and formed at opposite ends of the chamber. A valve member is disposed for reciprocable movement within the valve body which has separate valves at opposite ends thereof that are cooperable, respectively, with the inlet and outlet to control fluid flow therethrough. The valve which is cooperable with the outlet from the measuring chamber, however, is so interconnected with the inlet valve that fluid is not permitted to escape from the measuring chamber to the outlet until the measuring chamber inlet is closed by its respective valve.

A basic feature of the present invention resides in the provision of an outlet member which has sliding contact with the side walls of a cooperating passage to control fluid flow therethrough and which is directly and simply connected to the inlet valve member. Due to the configuration and positioning of the various parts of the valve structure the outlet valve moves in sliding contact with the wall of its cooperating passage whenever the inlet valve is disposed in an open position with respect to the inlet part, but upon closure of the inlet part by the inlet valve, the outlet valve moves out of contact with its cooperating passage and fluid is gravitationally dispensed from the valve.

Movement of the interconnected valves which control fluid flow through the inlet and outlet from the measuring chamber is herein illustrated and described as being effected by electrically energizable means but might be effected in any suitable manner.

It is therefore a principal object of the present invention to provide a fluid dispenser which is effective to dispense a measured quantity of fluid at selected intervals of time.

Another object of the present invention is to provide a valve means for controlling fluid flow to and from a measuring chamber which is effective to close the inlet to the measuring chamber before opening the outlet therefrom.

A still further and important object of the invention is to provide a pair of directly interconnected valve members for controlling fluid flow through the inlet and outlet from a fluid measuring chamber which are so cooperable with one another that fluid flow through the outlet from the chamber is prevented until the inlet to the measuring chamber has been closed by its respective valve.

Yet another object of the invention resides in the provision of a simple, rugged fluid dispenser which may be economically manufactured.

Figure 2:
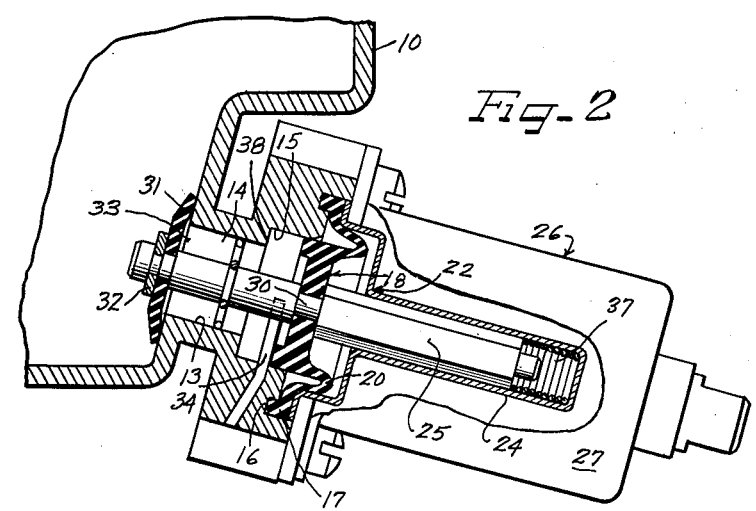

These and other objects of the present invention will become apparent from time to time as the following specification proceeds and with reference to the accompanying drawings, wherein:

FIGURE 1 is a vertical sectional view through the dispenser which forms the subject of the present invention and its associated container; and FIGURE 2 is a fragmental vertical sectional view which is similar to that shown in FIGURE 1 but which shows the interconnected valve members in a different position.

A container 10 is shown in FIGURE 1 as having an inlet 11 providing a means for filling the container 10 and as having a hollow boss 12 formed at the lower end thereof which constitutes a valve body. The boss 12 has a radially reduced passage 13 formed therein which defines a measuring chamber 14 and which opens, at its opposite ends, to the interior of the container 10 and a radially enlarged counterbore 15, respectively, the chamber 14 and counterbore 15 cooperating to form a variable diameter elongated bore within the boss 12.

An annular groove 16 is formed within the boss 12, adjacent the outer open end thereof, which is arranged to receive the annular peripheral thickened portion 17 of a flexible annular diaphragm or valve 18. The central portion 19 of the valve 18 has an outer diameter corresponding substantially to the inner diameter of the counterbore 15 so that the thickened central portion 19 of the diaphragm 18 will slidably but snugly fit within the counterbore 15 and form a valve element. A flexible relatively thin portion 20 of the valve or diaphragm 18 interconnects the central thickened portion 19 thereof with the peripheral bead 17 to permit recirpocable movement of the central thickened portion 19.

An annular flange 21 of an end cap 22 is seated against the peripheral bead 17 of the diaphragm 18 and is maintained in engagement therewith by means of an end plate 23. The end cap 22 has an elongated hollow guide 24 formed integrally therewith and centrally thereof which constitutes a guide for an armature 25 of a solenoid 26. A solenoid housing 27 encloses the usual coil and the guide 24 and has an outer flanged portion 28 which abuts the plate 23 and which is maintained in engagement therewith by means of a plurality of screws which are screw-threaded through the flange 28, the plate 23, and into the hollow boss 12.

The armature 25 extends from the guide 24 through the measuring chamber 14, where said armature constitutes a valve stem, and into the interior of the container 10 and is guided for reciprocable movement within the chamber 14 by means of a spider 29 which is press fitted against the side wall of the passage 13. The thickened central portion 19 of the diaphragm 18 is snugly fitted about a diametrically reduced portion 30 of the armature 25 so that movement of the armature 25 will effect movement of the central thickened portion 19 of the diaphragm 18.

A valve member 31 is similarly snugly fitted about a radially reduced end of the armature 25 and is maintained in proper position on the outer end of the armature by means of a retaining ring 32 and is of sufficient size to control fluid flow through the inlet port 33, which opens to the measuring chamber 14. As shown most clearly in FIGURE 2, an outlet port 34 is communicable with the interior of the hollow boss 12 and opens to the exterior of the boss 12. The valve 18 is effective to control fluid flow from the measuring chamber 14 to the outlet port 34 and, it will be noted, fluid communication between the chamber 14 and the port 34 is closed as long as the peripheral edge of the thickened central portion 19 of valve 18 is in engagement with the annular wall of the counterbore 15.

It will further be understood that a spring member 37 is interposed between the end of the guide 24 and the inner end of the armature 25 to bias the armature 25 and consequently the valve members 18 and 31 to the respective positions illustrated in FIGURE 1, wherein the valve member 18 is disposed in abutment with the annular shoulder 38 formed intermediate the counterbore 15 and the radially reduced passage 13.

A particularly important feature of the present invention is that the counterbore 15 is formed of such a depth that the valve member 18 will not permit fluid flow from the measuring chamber 14 to the outlet port 34 until after the valve member 31 has moved to a closed position with respect to the inlet port 33. In this manner, the inlet and outlet are never open at the same time so that the volume of fluid gravitationally dispensed from the valve will always equal the volumetric capacity of the dispenser intermediate the cooperating valve members as long as the inlet has a sufficient supply of liquid to be dispensed.

In operation the various components of the fluid dispenser will generally be disposed in the position illustrated in FIGURE 1 but upon energization of the solenoid 26 the armature 25 will move retractably with respect thereto against the opposing biasing force of the spring member 37 and the valve member 31 will move to close communication between the interior of the container 10 and the measuring chamber 14. Subsequent to the closure of the inlet port 33 the central thickened portion 19 of the diaphragm or valve member 18 will move out of the counterbore 15 and fluid will be communicated from the measuring chamber 14 to the fluid outlet port 34 from whence it will travel to its point of utilization.

Thus, applicant has provided a simple, efficient, yet rugged fluid dispenser which is of relatively simple design and which may be economically manufactured.

It will be understood that this embodiment of the invention has been used for illustrative purposes only and that various modifications and variations in the present invention may be effected without departing from the spirit and scope of the novel concepts thereof.

I claim as my invention:

A fluid dispensing apparatus comprising a container for fluid to be dispensed having a lower inner wall portion, a dispenser body leading from said container and having a measuring chamber in communication with said container through said lower inner wall portion and having a cylindrical wall portion, an outlet leading through the cylindrical wall portion of said measuring chamber and spaced axially along said chamber from said inner wall portion of said container, a valve stem extending axially along said chamber into said container, a resilient valve member on the end of said valve stem, a seat on said inner wall portion of said container engaged by said valve member to block the passage of fluid into said measuring chamber, a diaphragm extending across the opposite end of said dispensing body from said inner wall portion and having a cylindrical valve element joined therewith and spaced from said resilient valve member a distance less than the distance between said inner wall portion and said outlet, said cylindrical valve element fitting and being movable along said cylindrical wall portion to cover and uncover said outlet and to wipe fluid from said outlet upon the closing of said outlet.

References Cited in the file of this patent

UNITED STATES PATENTS

| | | |
|---|---|---|
| 941,760 | Cordley | Nov. 30, 1909 |
| 2,657,835 | Gerken et al. | Nov. 3, 1953 |
| 2,667,990 | Mojonnier | Feb. 2, 1954 |
| 2,723,055 | Beard | Nov. 8, 1955 |
| 2,887,255 | Bauerlein | May 19, 1959 |